United States Patent
Bartlett et al.

(10) Patent No.: US 10,264,464 B1
(45) Date of Patent: Apr. 16, 2019

(54) PROVIDING CELLULAR SERVICE ON A GUEST CARRIER FULLY ENCOMPASSED BY A HOST CARRIER

(71) Applicant: Sprint Spectrum L.P., Overland Park, KS (US)

(72) Inventors: Roger Bartlett, Merriam, KS (US); Arun Rajagopal, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 34 days.

(21) Appl. No.: 15/434,451

(22) Filed: Feb. 16, 2017

(51) Int. Cl.
*H04L 5/00* (2006.01)
*H04L 5/14* (2006.01)
*H04W 16/14* (2009.01)
*H04W 56/00* (2009.01)
*H04W 72/04* (2009.01)

(52) U.S. Cl.
CPC ........... *H04W 16/14* (2013.01); *H04L 5/0048* (2013.01); *H04L 5/14* (2013.01); *H04W 56/0005* (2013.01); *H04W 72/0453* (2013.01)

(58) Field of Classification Search
CPC ... H04W 16/14; H04W 48/16; H04W 74/006; H04W 84/042; H04W 88/08
See application file for complete search history.

(56) References Cited

U.S. PATENT DOCUMENTS

| | | | |
|---|---|---|---|
| 7,769,073 B2 | 8/2010 | Yarkosky | |
| 9,363,271 B1 | 7/2016 | Puliatti et al. | |
| 9,451,554 B1 | 9/2016 | Singh et al. | |
| 9,736,699 B1* | 8/2017 | Rao | H04W 16/14 |
| 2007/0143486 A1 | 6/2007 | Kang et al. | |
| 2010/0234040 A1 | 9/2010 | Palanki et al. | |
| 2013/0309971 A1* | 11/2013 | Kiukkonen | H04L 63/107 455/41.2 |
| 2014/0010086 A1* | 1/2014 | Etemad | H04W 4/70 370/235 |
| 2014/0161016 A1 | 6/2014 | Morioka et al. | |
| 2016/0095118 A1 | 3/2016 | Mizusawa | |
| 2016/0142911 A1 | 5/2016 | Kreiner et al. | |
| 2017/0019900 A1 | 1/2017 | McNamara et al. | |
| 2017/0257772 A1 | 9/2017 | Zhou et al. | |

OTHER PUBLICATIONS

U.S. Appl. No. 15/630,518, filed Jun. 22, 2017.
U.S. Appl. No. 15/374,439, filed Dec. 9, 2016.
First Action Interview Pilot Program Pre-Interview Communication from U.S. Appl. No. 15/630,518, dated Apr. 2, 2018.
First Action Interview Pilot Program Pre-Interview Communication from U.S. Appl. No. 15/374,439, dated Sep. 21, 2018.

* cited by examiner

*Primary Examiner* — Ayaz R Sheikh
*Assistant Examiner* — Debebe A Asefa

(57) ABSTRACT

A base station will be configured to provide service on a host carrier that has a particular frequency range and, concurrently, on a guest carrier that has a narrower frequency range and that is defined as a portion of and fully within the host-carrier's frequency range. With this arrangement, a portion of the host-carrier's air interface resources would thus also be air interface resources of the guest carrier.

16 Claims, 5 Drawing Sheets

PROVIDE SERVICE ON A HOST CARRIER, WHERE THE HOST CARRIER HAS A HOST-CARRIER FREQUENCY RANGE AND DEFINES, WITHIN THE HOST-CARRIER FREQUENCY RANGE, A HOST-CARRIER SHARED CHANNEL AND HOST-CARRIER CONTROL CHANNELS — 30

PROVIDE SERVICE ON A GUEST CARRIER CONCURRENTLY WITH PROVIDING SERVICE ON THE HOST CARRIER, WHERE THE GUEST CARRIER HAS A GUEST-CARRIER FREQUENCY RANGE THAT IS NARROWER THAN THE HOST-CARRIER FREQUENCY RANGE AND THAT IS DEFINED FULLY WITHIN AND AS A PORTION OF THE HOST-CARRIER FREQUENCY RANGE, AND WHERE THE GUEST CARRIER DEFINES, WITHIN THE GUEST-CARRIER FREQUENCY RANGE, A GUEST-CARRIER SHARED CHANNEL AND GUEST-CARRIER CONTROL CHANNELS — 32

Fig. 3

CONFIGURE A BASE STATION TO PROVIDE SERVICE ON A HOST CARRIER, WHERE THE HOST CARRIER HAS A HOST-CARRIER FREQUENCY RANGE AND DEFINES, WITHIN THE HOST-CARRIER FREQUENCY RANGE, A HOST-CARRIER SHARED CHANNEL AND HOST-CARRIER CONTROL CHANNELS ⟶ 40

CONFIGURE THE BASE STATION TO PROVIDE SERVICE ON A GUEST CARRIER, WITH THE SERVICE ON THE GUEST CARRIER BEING PROVIDED CONCURRENTLY WITH THE SERVICE ON THE HOST CARRIER, WHERE THE GUEST CARRIER HAS A GUEST-CARRIER FREQUENCY RANGE THAT IS NARROWER THAN THE HOST-CARRIER FREQUENCY RANGE AND THAT IS DEFINED FULLY WITHIN AND AS A PORTION OF THE HOST-CARRIER FREQUENCY RANGE, AND WHERE THE GUEST CARRIER DEFINES, WITHIN THE GUEST-CARRIER FREQUENCY RANGE, A GUEST-CARRIER SHARED CHANNEL AND GUEST-CARRIER CONTROL CHANNELS ⟶ 42

Fig. 4

PROVIDING CELLULAR SERVICE ON A GUEST CARRIER FULLY ENCOMPASSED BY A HOST CARRIER

BACKGROUND

A typical wireless communication system includes a number of base stations each radiating to provide coverage in which to serve wireless client devices (WCDs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Long Term Evolution (using Orthogonal Frequency Division Multiple Access (OFDMA) and Single Carrier Frequency Division Multiple Access (SC-FDMA)), Code Division Multiple Access (CDMA) (e.g., 1×RTT and 1×EV-DO), Global System for Mobile Communications (GSM), IEEE 802.11 (WIFI), BLUETOOTH, and others.

In accordance with the air interface protocol, a base station may provide service on one or more carriers, each spanning particular radio-frequency on which communications can flow wirelessly between the base station and WCDs. Such a carrier could be structured to provide a downlink for carrying communications from the base station to WCDs and an uplink for carrying communications from WCDs to the base station. For instance, the carrier could be frequency division duplex (FDD), with separate frequency ranges provided respectively for downlink and uplink communication, or time division duplex (TDD), with a single frequency range being time division multiplexed between downlink and uplink use.

Through modulation or other means on the carrier, in accordance with the air interface protocol, the downlink and uplink could then be structured to define various channels for carrying communications between the base station and WCDs. For instance, the downlink could be structured to define (i) a downlink shared channel with resources allocable by the base station for carrying data from the base station to WCDs and (ii) downlink control channels with resources configured to carry control signaling from the base station to WCDs. And the uplink could be structured to define (i) an uplink shared channels with resources allocable by the base station for carrying data from WCDs to the base station and (ii) uplink control channels with resources configured to carry control signaling from WCDs to the base station.

OVERVIEW

A representative air interface protocol may support carriers that have specific frequency bandwidths (as the frequency ranges of the downlink and uplink using FDD carrier, or as the shared downlink/uplink frequency range using TDD). For example, LTE supports carriers that have bandwidths of 1.4 MHz, 3 MHz, 5 MHz, 10 MHz, 15 MHz, and 20 MHz (and may support wider bandwidths in some frequency bands). Thus, LTE base stations could be configured to provide service on one or more carriers each having one those supported LTE bandwidths. To facilitate this, a wireless service provider could acquire a license for radio frequency spectrum and could configure base stations to provide service on carriers of such bandwidths within the licensed spectrum.

For various reasons, however, a wireless service provider may face a scenario where one of its base stations is or will be configured to provide service on a carrier of particular bandwidth and where the service provider would like to have the base station also provide service on another carrier of a narrower bandwidth, but without the need to license or otherwise add more spectrum for that other carrier.

By way of example, a base station could be configured to provide service on a 20 MHz carrier, and the service provider may want to additionally configure the base station to provide service on a 5 MHz carrier, without the need to add 5 MHz of spectrum. In practice, for instance, this situation could arise if the service provider would like to have the base station provide service on a 5 MHz carrier on behalf of another service provider (e.g., a mobile virtual network operator (MVNO)) and/or to have the base station provide such service for a special class of WCDs, but without the need to add 5 MHz of spectrum to the base station.

Disclosed herein is a method and system to help address such a scenario. In accordance with the disclosure, a base station will be configured to provide service on a host carrier that has a particular frequency range and, concurrently, on a guest carrier that has a narrower frequency range and that is defined as a portion of and fully within the host-carrier's frequency range. With this arrangement, a portion of the host-carrier's air interface resources would thus also be air interface resources of the guest carrier.

In practice, the host carrier and guest carrier could each be structured to include the shared and control channels prescribed by an applicable air interface protocol (though the base station could alternatively use different air interface protocols and thus different structures on the guest carrier than on the host carrier). For instance, each carrier could define its own shared channel and its own control channels. Further, because the guest carrier will occupy a portion of the host carrier, the guest carrier and base station could be configured in a manner that helps avoid or minimize conflict between the two carriers but that allows the carriers to share use of certain resources.

For example, the guest carrier could be defined within the host carrier at a position that is selected to avoid overlap of certain key host-carrier control channels (e.g., synchronization signals and control format indicator signals) with corresponding key guest-carrier control channels but that allows overlap of one or more other particular control channels (e.g., reference signals). And as another example, the base station could be configured to avoid assignment of shared-channel resources on either carrier in a manner that would conflict with control-channel or shared-channel resource use on the other carrier. Further, as to resources that are common to both carriers (i.e., within the portion of the host carrier occupied by the guest carrier), the base station could be configured to prioritize use of those resources for the guest carrier but could still allow use of those resources for the host carrier when the resources are not needed for service on the guest carrier. Other examples are possible as well.

Accordingly, in one respect, disclosed is a method for a base station to provide cellular wireless service on a guest carrier and a host carrier. In accordance with the disclosure, the method includes the base station providing service on the host carrier, where the host carrier has a host-carrier frequency range and defines, within the host-carrier frequency range, a host-carrier shared channel and host-carrier control channels. Further, the method includes the base station providing service on the guest carrier concurrently with the service on the host carrier, where the guest carrier has a guest-carrier frequency range that is narrower than the host-carrier frequency range and that is defined fully within and as a portion of the host-carrier frequency range, and where the guest carrier defines, within the guest-carrier frequency range, a guest-carrier shared channel and guest-carrier control channels.

Moreover, in another respect, disclosed is a method for configuring a base station for concurrent service on a host carrier and a guest carrier. In accordance with the disclosure, the method includes configuring the base station to provide service on the host carrier, where the host carrier has a host-carrier frequency range and defines, within the host-carrier frequency range, a host-carrier shared channel and host-carrier control channels. And the method further includes configuring the base station to provide service on the guest carrier concurrently with the service on the host carrier, where the guest carrier has a guest-carrier frequency range that is narrower than the host-carrier frequency range and that is defined fully within and as a portion of the host-carrier frequency range, and where the guest carrier defines, within the guest-carrier frequency range, a guest-carrier shared channel and guest-carrier control channels.

In addition, in yet another respect, disclosed is a base station configured to provide service on a host carrier and on a guest carrier within the host carrier, where the host carrier has a host-carrier frequency range, and where the guest carrier has a guest-carrier frequency range that is narrower than the host-carrier frequency range and that occupies a portion of the host-carrier frequency range and is fully encompassed by the host-carrier frequency range. As disclosed, the base station includes an antenna structure configured to transmit and receive air interface communication on the host carrier and on the guest carrier, and the base station includes a radio unit configured to output control signals for transmission by the antenna structure on the host carrier and to output guest-carrier control signals for transmission by the antenna structure on the guest carrier.

As further disclosed, in this arrangement, the radio unit outputs for transmission on the host carrier (i) a host-carrier synchronization signal, (ii) a host-carrier control format indicator signal, and (iii) a host-carrier reference signal, and the radio outputs for transmission on the guest carrier (i) a guest-carrier synchronization signal, (ii) a guest-carrier control format indicator signal, and (iii) a guest-carrier reference signal. Further, the guest-carrier frequency range is disposed within the host-carrier frequency range at a position that (a) avoids overlap of the host-carrier synchronization signal with the guest-carrier synchronization signal, (b) avoids overlap of the host-carrier control format indicator signal with the guest-carrier control-format indicator signal, and (c) has the guest-carrier reference signal coincide with the host-carrier reference signal within the guest carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 3 is a flow chart depicting example operations in accordance with the disclosure.

FIG. 4 is another flow chart depicting example operations in accordance with the disclosure.

DETAILED DESCRIPTION

Figure 1:
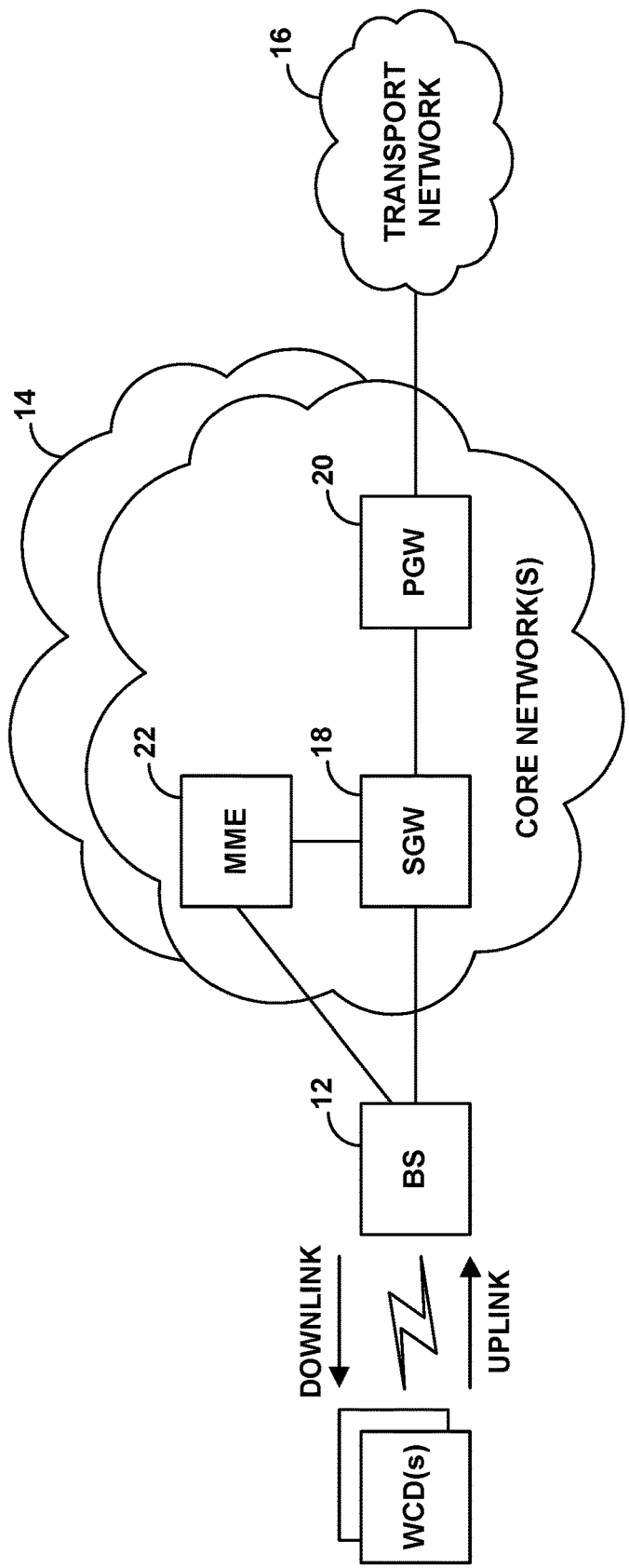
FIG. 1 is a simplified block diagram of an example LTE network.

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Referring to the drawings, as noted above, FIG. 1 is a simplified block diagram of an example LTE network. This network functions primarily to serve WCDs with wireless packet data communication service, including possibly voice-over-packet service, but may also provide other functions. As shown, the LTE network includes a representative LTE base station (evolved Node-B (eNodeB)) 12, which would have an antenna structure and associated equipment (e.g., baseband unit, radio, and amplifier) for providing a respective LTE coverage area in which to serve WCDs. This base station could take any of a variety of forms, such as a macro base station, a small cell base station, and/or a relay base station, among other possibilities. Likewise, the WCDs could take various forms, such as any of those noted above for instance.

As further shown, the base station has a communication interface with one or more core networks 14 each operated by a service provider or operator and defining a respective public land mobile network (PLMN), and each of which may provide connectivity with a transport network 16 such as the Internet. In an example arrangement, for instance, the base station could provide connectivity with a single operator's core network for a single PLMN and could be configured to serve WCDs that subscribe to service of that PLMN. And in another example arrangement, the base station could provide connectivity with two or more operators' core networks for separate, respective PLMNs and could be configured to serve WCDs that subscribe to service of any of those PLMNs. FIG. 1 depicts example components of an example core network. In particular, the example core network could include a serving gateway (SGW) 18, a packet-data-network gateway (PGW) 20, and a mobility management entity (MME) 22.

As noted above, a representative base station may provide service on one or more carriers, each defining a downlink and an uplink. For instance, the base station could provide service on an FDD carrier that defines separate downlink and uplink frequency ranges and/or on a TDD carrier that defines a frequency range time division multiplexed between downlink and uplink use. In either case, the carrier bandwidth could optimally be one of the standard LTE bandwidths noted above. More particularly, each carrier can be characterized by its center frequency and its bandwidth centered on that frequency.

In accordance with the LTE protocol, the air interface on the carrier is subdivided in the time domain and the frequency domain to define an array of resource elements for carrying modulated communications between the base station and WCDs. In particular, in the time domain, the air interface defines a continuum of 10-millisecond (ms) frames, each of which is divided into ten 1-ms subframes, and each subframe is then further divided into two 0.5-ms timeslots and fourteen 66.67-microsecond (μs) symbol time segments (or twelve symbol time segments if an extended cyclic prefix is used). And in the frequency domain, the carrier bandwidth is divided into 15-kHz subcarriers (as many as would fit within the carrier bandwidth). With this arrangement, the air interface on the carrier thus defines an array of resource elements each occupying a 15 kHz subcarrier and spanning a 66.67 μs symbol time segment, and the base station and WCDs can communicate with each other through modulation of data in these resource elements.

Further, LTE defines particular groupings of resource elements as resource blocks. In the time domain, each resource block has a duration corresponding to one timeslot (i.e., 7 symbol time segments, over 0.5 ms). And in the frequency domain, each resource block spans 12 subcarriers (i.e., 180 kHz). Thus, across the carrier bandwidth in each subframe, the LTE air interface is divided into 12-subcarrier groups, and for every 12-subcarriers, there are two resource blocks, one in each timeslot of the subframe. Depending on the carrier bandwidth the LTE air interface thus supports a certain number of such resource blocks across the carrier in each timeslot. For instance, a 5 MHz carrier supports 25 resource blocks across its bandwidth, a 10 MHz carrier supports 50 resource blocks across its bandwidth, and a 20 MHz carrier supports 100 resource blocks across its bandwidth.

In addition, LTE designates certain resource elements on the downlink and uplink to be used for particular control channel or shared channel communications.

For instance, on the downlink, the first one, two or three symbol time segments per subframe (or per downlink subframe in TDD) across the carrier bandwidth generally define a downlink control region for carrying control signaling from the base station to WCDs. Within this control region, certain resource elements at the low-frequency end of the carrier bandwidth in the first symbol time segment per subframe are reserved to define a physical control format indicator channel (PCFICH) that specifies how many symbol time segments per subframe define the downlink control region, so that WCDs can determining the size of the control region. Further, the remainder of the control region then defines various other control channels, primarily a physical downlink control channel (PDCCH) for carrying scheduling directives and the like from the base station to the WCD.

Following the control region in time, the remaining eleven, twelve, or thirteen symbol time segments per downlink subframe across the carrier bandwidth then generally define a shared channel region or physical downlink shared channel (PDSCH) for carrying scheduled data communications from the base station to WCDs within designated resource blocks. In practice, when the base station is serving a WCD, the base station can transmit data to the WCD by scheduling particular resource blocks in the PDSCH to carry the data, transmitting in the PDCCH a downlink control information (DCI) message, masked with an identifier of the WCD, that specifies the scheduled resource blocks, and modulating the data in the resource elements of the designated resource blocks. By searching through the control region (as defined by the PCFICH) per subframe, the WCD could thus find and read the DCI message to determine the resource blocks that carry the data destined to the WCD, and the WCD could then demodulate the resource elements of those resource blocks to obtain the data.

In addition, LTE reserves certain resource elements on the downlink for other purposes. For instance, certain resource elements distributed in a specific pattern throughout the carrier bandwidth per subframe (typically four resource elements distributed in each resource block, in locations within both the control channel region and the shared channel region), are reserved to carry a cell-specific reference signal that WCDs can measure as a basis to evaluate coverage strength. LTE defines three such reference-signal resource element patterns, and a given LTE cell on a given carrier can be set to use one of those three patterns.

Further, in the sixth and seventh symbol time segments of the first and sixth subframe of each frame, a group of 62 resource elements centered within the carrier bandwidth (thus within the 6 center resource blocks) are reserved as synchronization channels, which carry primary and secondary carrier-synchronization signals that WCDs can detect as a basis to determine frame timing, cell identification, and reference-signal configuration. In practice, a WCD configured for LTE service could be provisioned or provided with a list of carriers on which the WCD can operate, designating each carrier by its center frequency and bandwidth for instance. Thus, when the WCD first powers on, the WCD could scan for and detect coverage on such a carrier and could scan for a primary synchronization signal on the carrier in order to determine the carrier frame timing, cell identification, and reference-signal configuration.

In particular, the WCD could read the 62 centrally located resource elements over time on the carrier until the WCD finds that those resource elements carry a primary synchronization signal of a predefined form or value. Given knowledge of the relative time position of that primary synchronization signal within a frame as noted above, the WCD could thereby learn the frame timing, so that the WCD can then read other downlink communications on the carrier. Further, based on the primary synchronization signal position, the WCD could also find the secondary synchronization signal and could compute the cell identification (physical cell identity (PCI)) as a function of those two signals' values. And the WCD could further determine which reference-signal pattern is used on the carrier, based on a modulo-3 function of the primary synchronization signal value (or of the PCI value), so that the WCD can then evaluate coverage strength.

Still further, in the eighth through eleventh symbol time segments of the first subframe per frame, a group of 72 resource elements centered within the carrier bandwidth (thus also within the 6 center resource blocks) are reserved for use as a physical broadcast channel (PBCH) for carrying system information broadcast messages. Thus, in practice, once a WCD has determined frame timing, the WCD could read the PBCH to obtain important system operational parameters.

On the uplink, on the other hand, certain resource blocks at the low end and high end of the carrier bandwidth (e.g., the first two and last two, frequency wide) generally define an uplink control region, primarily as a physical uplink control channel (PUCCH), for carrying control signaling from WCDs to the base station. And the resource blocks in between the low and high end PUCCH resource blocks generally define an uplink shared channel region, as a physical uplink shared channel (PUSCH), for carrying scheduled data communications from WCDs to the base station. In practice with this arrangement, when a WCD has data to transmit to the base station, the WCD may transmit a scheduling request in PUCCH resources. And the base station could then schedule particular resource blocks in the PUSCH to carry the data and transmit in the PDCCH a downlink control information (DCI) message, masked with an identifier of the WCD, that specifies the scheduled resource blocks. And the WCD could then modulating the data in the resource elements of the designated resource blocks, for receipt by the base station.

In addition, the base station could reserve certain resource elements on the uplink for other purposes as well. For instance, through PBCH signaling or the like, the base station could designate particular groups of uplink resource elements to define a physical random access channel (PRACH) for carrying random access control signaling from WCDs to the base station, and the base station could designate other groups of uplink resource elements to carry WCD-specific reference signals (sounding reference signals) that the base station can use to evaluate WCD uplink timing and the like.

In operation, once a WCD has entered into base station coverage on a carrier such as this and has established frame timing and determined that coverage strength is sufficient, the WCD could engage in signaling with the base station and an associated core network to register for service. For instance, the WCD could read the PBCH to determine where the PRACH is located on the uplink, and the WCD could then transmit a random access signaling message to the base station on the PRACH and engage in further signaling with the base station to establish a radio-link-layer connection (Radio Resource Control (RRC) connection). Through the established radio-link-layer connection, the WCD could then transmit an attach request, which the base station could forward to the MME for processing. And the MME could then coordinate establishment for the WCD of one or more bearers for carrying data between the WCD and the PGW, thus enabling the WCD to engage in communication on the transport network 16.

Once the WCD is so attached with the base station on a given carrier, the base station could then serve the WCD on the carrier as noted above. Namely, as data arrives for the WCD, the base station could schedule the transmission on resource blocks of the PDSCH, and the base station could accordingly engage in the transmission. And as the WCD has data to transmit, the base could schedule the transmission on resource blocks of the PUSCH, and the WCD could accordingly engage in the transmission.

In accordance with the present disclosure as discussed above, a base station could be configured to provide service concurrently on at least two such carriers, with one carrier being defined fully within and occupying just a portion of the frequency range of the other carrier. In line with the discussion above, the wider carrier would be considered a host carrier, and the narrower carrier defined within the host carrier would be considered a guest carrier.

In practice, these two carriers could be time-aligned with each other, having the same frame timing and subframe timing as each other. Thus, each new frame of the guest carrier would start at the same time as a new frame of the host carrier starts, and each new subframe of the guest carrier would start at the same time as a new subframe of the host carrier starts. Further, both carriers could be TDD and could have the same TDD configuration as each other (such that downlink subframes of the guest carrier occur when downlink subframes of the host carrier occur, and uplink subframes of the guest carrier occur when uplink subframes of the host carrier occur) or could possibly have different TDD configurations than each other. (Alternatively, both of the carriers could be FDD could take still other forms.) Moreover, it could be possible to define more than one guest carrier within a given host carrier.

Each of these carriers could be configured respectively with the LTE channels as discussed above, with the base station being configured to provide service on both of the carriers by making use of each carrier's respective channels as noted above.

For instance, for the host carrier, the base station could be programmed to broadcast host-carrier synchronization signals in the center 6 resource blocks of the host carrier's bandwidth so as to enable WCDs searching for the host carrier to find the host carrier and so forth as noted above. (As the host-carrier synchronization signals would be broadcast at the center of the host-carrier bandwidth, they would thus underscore that the host carrier is so centered, even though the guest carrier may also occupy a portion of the host-carrier's frequency bandwidth). Further, the base station could further be programmed to provide host-carrier PBCH, PCFICH, PDCCH, and other downlink transmissions and functionality as discussed above to facilitate downlink operation on the host carrier. And still further, the base station could be programmed to receive WCD control signaling in the resource blocks defining the host-carrier's PUCCH, PRACH, and SRS as discussed above.

And on the guest carrier, the base station could be programmed broadcast guest-carrier synchronization signals in the center 6 resource blocks of the guest carrier's bandwidth so as to enable WCDs searching for the guest carrier to find the guest carrier and so forth as noted above, and the base station could further be programmed to provide guest-carrier PBCH, PCFICH, PDCCH, and other downlink transmissions and functionality as discussed above to facilitate downlink operation on the guest carrier. And further, the base station could be programmed to receive WCD control signaling in the resource blocks defining the guest-carrier's PUCCH, PRACH, and SRS as discussed above.

Considering that the guest carrier will by definition use a portion of the host carrier's air interface resources with this an arrangement, it could be useful in practice to position the guest carrier in the host carrier's frequency range at a frequency position that is selected to help avoid conflict between certain key control channels of the carriers. For instance, without limitation, it could be useful to position the guest carrier such that, on the downlink, (i) each carrier's synchronization signals do not overlap with the other carrier's synchronization signals, (ii) each carrier's PCFICH does not overlap with the other carrier's PCFICH, and (iii) each carrier's PBCH does not overlap with the other carrier's PBCH. Further, it could be useful to position the guest carrier such that, on the uplink, each carrier's PUCCH does not overlap with the other carrier's PUCCH. (And as for the PRACH and SRS, similar positioning criteria could also apply, or the base station could configure the PRACH and SRS on each carrier (via the PBCH) to avoid overlaps of one carrier's PRACH or SRS with the other carrier's PRACH or SRS.) Other such criteria could exist as well.

Depending on the bandwidths at issue, various guest-carrier frequency positions within the host-carrier could meet these and/or other criteria.

Figure 2:
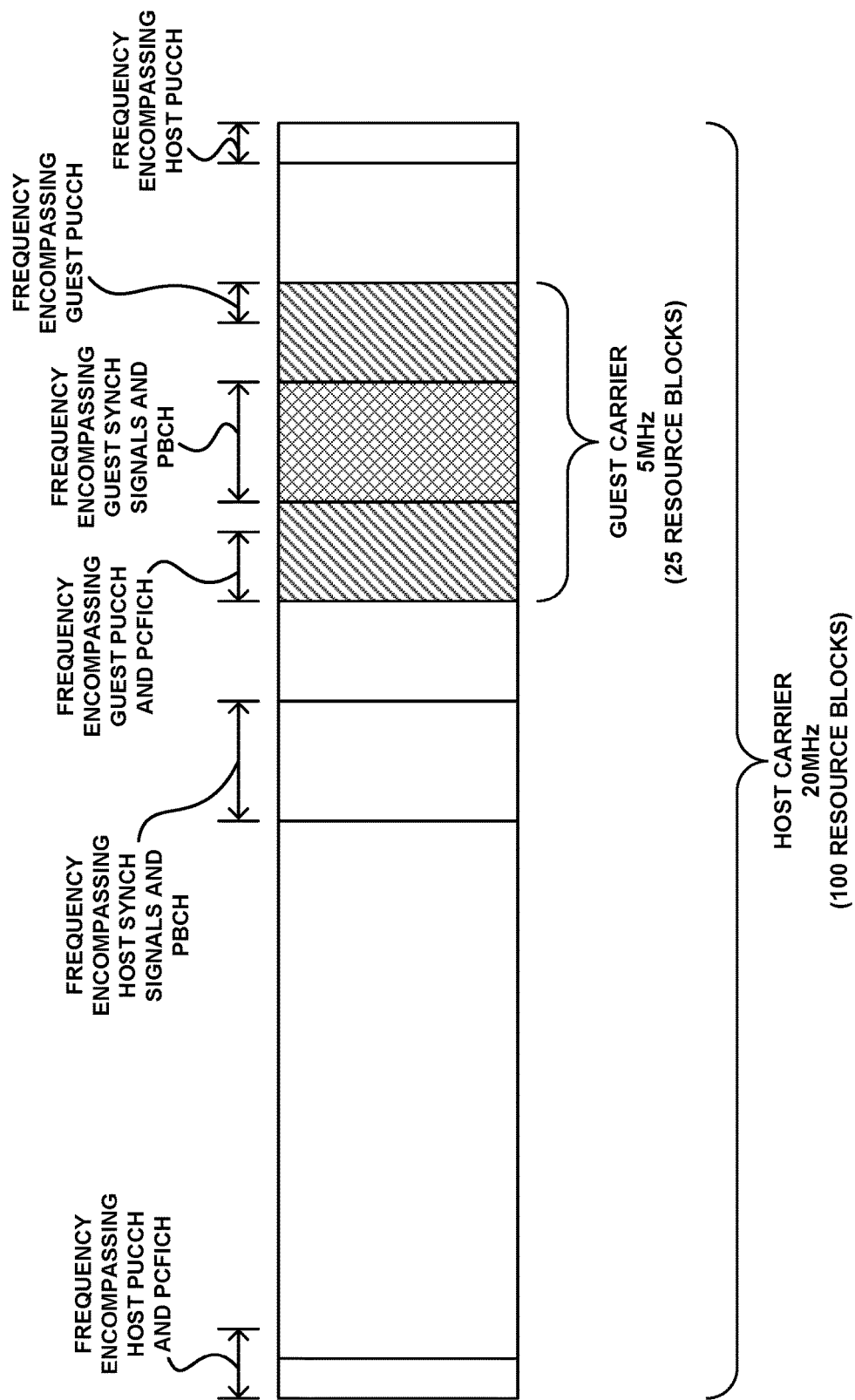
FIG. 2 is an illustration of host-carrier and a guest-carrier within the host carrier.

FIG. 2 depicts one example implementation (not to scale), where the host carrier has a 20 MHz frequency range and where the guest carrier has a 5 MHz frequency range. As noted above, the 20 MHz carrier could support 100 resource blocks carrier wide, and the 5 MHz carrier could support 25 resource blocks carrier wide. Further, in an example LTE implementation, the 20 MHz carrier would likely be TDD, and the 5 MHz carrier could be TDD as well.

FIG. 2 depicts a generalized subframe of the 20 MHz host carrier as a non-limiting example and shows some frequency portions of the host carrier that could be considered off-limits for implementing the guest carrier to help meet the example criteria noted above. In particular, as shown, portions of the host carrier's 20 MHz bandwidth that could be deemed off-limits for the guest carrier include (i) the six center resource blocks, as those would be used at certain times for the host-carrier's synchronization signals and at other times for the host-carrier's PBCH, (ii) the low-end five or so resource blocks, as those would be used at certain times for the host carrier's PCFICH and the lowest end resource blocks would be used on the uplink for the host-carrier's PUCCH, and (iii) the high-end two or so resource blocks, as those would be used on the uplink for the host carrier's PUCCH.

Given these example limitations, the 5 MHz guest carrier could be positioned within the 20 MHz host carrier between these restricted areas. As one of possibly many examples, FIG. 2 shows the guest carrier being positioned in between the host-carrier's 6 center resource blocks and the host carrier's high-end resource blocks. That position would optimally avoid the overlap issues noted above and could thus work in practice.

Optimally, the guest carrier positioning within the host carrier would further be such that resource blocks of the guest carrier are aligned in frequency with resource blocks of the host carrier. And the base station could be configured to use the same reference-signal resource element pattern on both carriers, so that the guest-carrier resource elements that carry the guest-carrier reference signal are also host-carrier resource elements that carry a portion of the host-carrier reference signal. The base station could be so configured by setting the primary synchronization signal values on the carriers such that their modulo-3 functions would both be the same, corresponding with the same reference-signal resource element pattern.

In effect, with this arrangement, the base station could thus be considered to be broadcasting a host-carrier reference signal on the host carrier and a guest-carrier reference signal on the guest carrier, even though, within the reference signals are one and the same within the guest carrier. From the perspective of WCDs, a WCD that the base station is serving on the host carrier could evaluate the host-carrier reference signal throughout the host carrier, and a WCD that the base station is serving on the guest carrier could evaluate the guest-carrier reference signal (which happens to be the same as a portion of the host-carrier reference signal) throughout the guest carrier.

In practice, with the host-carrier and guest carrier arrangement such as that shown in FIG. 2 for instance, the base station could thus provide service concurrently on the host carrier and on the guest carrier. For example, the base station could serve one or more WCDs on the host carrier while also serving one or more WCDs on the guest carrier.

In line with the discussion above, in so operating, the base station could use the host carrier for serving WCDs generally or perhaps just WCDs of a certain class, and the base station could use the guest carrier for serving WCDs of another class. The distinction between WCDs in this process could be based on various criteria. For instance, the distinction could be based on the PLMN to which each WCD subscribes. Thus, if the base station provides service for two or more PLMNs as discussed above, the base station might restrict or prioritize use of the guest-carrier for serving WCDs that subscribe to a particular one or more of those PLMNs, and the base station might allow WCDs that subscribe to any other of the PLMNs to be served on the wider host carrier.

To facilitate this in practice, all such WCDs could be provisioned with a list of carriers including the host carrier (namely, the host carrier's center frequency and bandwidth), and so any such WCD could detect and attach with the base station on the host carrier. During the connection or attach process, however, a WCD could report the identity of its serving PLMN (PLMN-ID), and the base station could programmatically determine whether that PLMN is one for which the base station should provide service on the guest carrier. If so, then the base station could engage in signaling (e.g., RRC-connection-reconfiguration signaling) with the WCD to transition the WCD to be served instead on the guest carrier, informing the WCD of the guest carrier's center frequency and bandwidth so that the WCD can then synchronize with the guest carrier and the base station can then serve the WCD on the guest carrier.

Alternatively, WCDs that subscribe to one or more certain PLMNs could be provisioned with a list of carriers that includes the host carrier (namely, the host carrier's center frequency and bandwidth), and WCDs that subscribe to one or more other PLMNs could be provisioned with a list of carriers that includes the guest carrier (namely, the guest carrier's center frequency and bandwidth). Thus, depending on the PLMN to which a WCD subscribes, the WCD may detect and attach on the host carrier, or the WCD may detect and attach on the guest carrier.

As the base station then provides service on the host carrier while also providing service on the guest carrier, the base station could make full use of the host carrier's control channels as discussed above. For instance, the base station could provide the host carrier's synchronization signals, PBCH, PCFICH, PDCCH, and cell-specific reference signal and could receive the host carrier's PUCCH, PRACH, and SRS transmissions. In scheduling shared-channel transmission on the host carrier, the base station could avoid scheduling resource blocks that coincide with the shared channel of the guest carrier, restricting use of those resource blocks for the guest carrier. Or the base station could prioritize use of those resource blocks for the guest carrier but could allow use of those resource blocks for the host carrier if and when they are not needed for guest-carrier use.

Further, as the base station provides service on the guest carrier while also providing service on the host carrier, the base station could also make full use of the guest carrier's control channels as discussed above. For instance, the base station could provide the guest carrier's synchronization signals, PBCH, PCFICH, PDCCH, and cell-specific reference signal and could receive the guest carrier's PUCCH, PRACH, and SRS transmissions.

FIG. 3 is next a flow chart depicting operations of a method that could thus be carried out in accordance with the above discussion, for a base station to provide cellular wireless service on a guest carrier and a host carrier. As shown in FIG. 3, at block 30, the base station provides service on the host carrier, where the host carrier has a host-carrier frequency range and defines, within the host-carrier frequency range, a host-carrier shared channel and host-carrier control channels. And at block 32, the base station provides service on the guest carrier concurrently with providing service by the base station on the host carrier, where the guest carrier has a guest-carrier frequency range that is narrower than the host-carrier frequency range and that is defined fully within and as a portion of the host-carrier frequency range, and where the guest carrier defines, within the guest-carrier frequency range, a guest-carrier shared channel and guest-carrier control channels.

In line with the discussion above, in this method, the act of providing service on the host carrier could involve providing the service on the host carrier using a frame structure that defines a continuum of frames each having subframes, and the act of providing service on the guest carrier could involve providing the service on the guest carrier using the same frame structure, wherein frames of the service on the host carrier are time-aligned with frames of the service on the guest carrier, and wherein subframes of the service on the host carrier are time-aligned with subframes of the service on the guest carrier. Further, the host carrier and guest carrier could both be TDD and could both use a common TDD frame configuration, in which case downlink subframes of the host carrier could be time-aligned with downlink subframes of the guest carrier, and uplink subframes of the host carrier could be time-aligned with uplink subframes of the guest carrier.

As further discussed above, each subframe on the host carrier could be divided into air interface resources. And in that case, the act of providing service on the guest carrier concurrently with providing service on the host carrier could involve (i) reserving a portion of the air interface resources per subframe for use as the guest-carrier shared channel and precluding (avoiding) use of the portion of the air interface resources per subframe for the host-carrier shared channel or (ii) prioritizing a portion of the air interface resources per subframe for use as the guest-carrier shared channel but allowing use of the portion of the air interface resources per subframe for the host-carrier shared channel.

In addition, as discussed above, the act of providing service on the host carrier could involve broadcasting, within the host carrier, at least one host-carrier synchronization signal that defines (i) a time-reference of the host carrier and (ii) an identification of the host carrier, and the act of providing service on the guest carrier could involve broadcasting, within the guest carrier, at least one guest-carrier synchronization signal that defines (i) a time-reference of the guest carrier and (ii) an identification of the guest carrier. And with this arrangement, the guest carrier could be defined within the host carrier at a frequency position that is selected at least to avoid overlap of the at least one host-carrier synchronization signal with the at least one guest-carrier synchronization signal.

Further, the act of providing service on the host carrier could involve broadcasting, within the host carrier, a host-carrier control-format indicator specifying a format of a host-carrier control channel (e.g., a number of symbol time segments used for a control region), and the act of providing service on the guest carrier could involve broadcasting, within the guest carrier, a guest-carrier control-format indicator specifying a format of a guest-carrier control channel. And with that arrangement, the guest carrier could be defined within the host carrier at a frequency position that is selected to avoid overlap of the host-carrier control-format indicator with the guest-carrier control-format indicator.

Still further, the act of providing service on the host carrier could involve broadcasting, within the host carrier, a host-carrier reference signal, and the act of providing service on the guest carrier could involve broadcasting, within the guest carrier, a guest-carrier reference signal. And with that arrangement, within the guest carrier, the guest-carrier reference signal coincides with the host-carrier reference signal.

In addition, as discussed above, the act of providing service on the guest carrier concurrently with providing service on the host carrier could involve broadcasting certain host-carrier signals concurrently with broadcasting certain guest-carrier signals, and could further involve serving one or more WCDs on the host carrier currently with serving one or more WCDs on the guest carrier. Further, providing such service could also involve receiving a request from a WCD to be served and, responsive to the request, determining based on a service class of the WCD (e.g., PLMN to which the WCD subscribes) which carrier on which to serve the WCD.

And as further noted above, more than one guest carrier could be defined with the host carrier. Thus, in the method of FIG. 3, the guest carrier could be considered a first guest carrier, and the portion of the host-carrier frequency range in which the first guest carrier is defined could be considered a first portion. And the method could then further include the base station providing service on a second guest carrier concurrently with providing service on the host carrier and on the first guest carrier, where the second guest carrier has a second guest-carrier frequency range that is narrower than the host-carrier frequency range and that is defined fully within and as a second portion of the host-carrier frequency range not overlapping with the first portion of the host-carrier frequency range, and wherein the second guest carrier defines a second guest-carrier shared channel and second guest-carrier control channels. For instance, the second guest carrier could be defined in another frequency position within the host carrier that also meets criteria such as those noted above.

FIG. 4 is next a flow chart depicting operations of a method that could be carried out in accordance with the above discussion, for configuring a base station to provide concurrent service on a host carrier and a guest carrier. This method could be carried out by a wireless service provider that owns or operates the base station and/or by base station manufacturer or other entity.

As shown in FIG. 4, at block 40, the method includes configuring the base station to provide service on the host carrier, where the host carrier has a host-carrier frequency range and defines, within the host-carrier frequency range, a host-carrier shared channel and host-carrier control channels. And at block 42, the method includes configuring the base station to provide service on the guest carrier concurrently with providing service on the host carrier, where the guest carrier has a guest-carrier frequency range that is narrower than the host-carrier frequency range and that is defined fully within and as a portion of the host-carrier frequency range, and where the guest carrier defines, within the guest-carrier frequency range, a guest-carrier shared channel and guest-carrier control channels.

In this method, the configuring of the base station could involve programming the base station as noted, such as programming a baseband unit and radio unit of the base station to both (i) provide the service on the host carrier (including transmitting on the various downlink host-carrier channels and receiving on the various uplink host-carrier channels as noted above) and (ii) provide the service on the guest carrier (including transmitting on the various downlink guest-carrier channels and receiving on the various uplink guest-carrier channels as noted above).

Thus, in practice, configuring the base station to provide service on the host carrier could involve configuring the base station to provide service on the host carrier using a frame structure that defines a continuum of frames each defining subframes, and configuring the base station to provide service on the guest carrier could involve configuring the base station to provide service on the guest carrier using the same frame structure, with time alignment as noted above.

Further, configuring the base station to provide service on the host carrier and guest carrier could involve configuring the base station to provide on each carrier respectively (i) a synchronization signal (which could include the two synchronization signals noted above), (ii) a control-format indicator, and (iii) a reference signal. And the guest carrier could be defined within the host carrier at a frequency position that (i) avoids overlap of the host-carrier synchronization signal with the guest-carrier synchronization signal, (ii) avoids overlap of the host-carrier control format indicator with the guest-carrier control-format indicator, and (iii) has the guest-carrier reference signal coincide with the host-carrier reference signal within the guest carrier.

Figure 5:
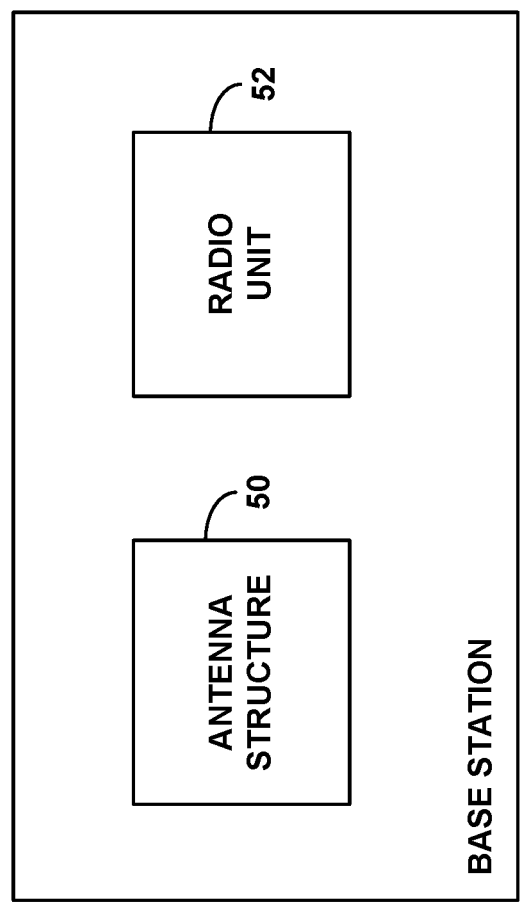
FIG. 5 is a simplified block diagram of a base station that could operate in accordance with the disclosure.

Finally, FIG. 5 is a simplified block diagram of an example base station that could be configured to provide service on a host carrier and on a guest carrier within the host carrier, where the host carrier has a host-carrier frequency range, and where the guest carrier has a guest-carrier frequency range that is narrower than the host-carrier frequency range and that occupies a portion of the host-carrier frequency range and is fully encompassed by the host-carrier frequency range.

As shown in FIG. 5, the base station includes an antenna structure 50 and a radio unit 52.

The antenna structure 50 could be configured to transmit and receive air interface communication on the host carrier and on the guest carrier. Namely, the antenna structure could be a typical base station antenna structure, which could operate to engage in radio-frequency transmission and reception, and the antenna structure could then engage in communication on the host carrier and on the guest carrier through interaction with the radio unit.

The radio unit could then include a radio-frequency transceiver that outputs for transmission on the host carrier at least (i) a host-carrier synchronization signal, (ii) a host-carrier control format indicator signal, and (iii) a host-carrier reference signal, and that outputs on the guest carrier at least (i) a guest-carrier synchronization signal, (ii) a guest-carrier control format indicator signal, and (iii) a guest-carrier reference signal. And as discussed above, the guest-carrier frequency range could be disposed within the host-carrier frequency range at a position that (i) avoids overlap of the host-carrier synchronization signal with the guest-carrier synchronization signal, (ii) avoids overlap of the host-carrier control format indicator signal with the guest-carrier control-format indicator signal, and (iii) has the guest-carrier reference signal coincide with the host-carrier reference signal within the guest carrier.

Various operational features discussed above could then be incorporated in this base station. For instance, the frame structures of the host carrier and guest carriers could be aligned (which the base station could achieve by aligning in time the synchronization signals of the host carrier with the synchronization signals of the guest carrier). Further, the base station could be configured (e.g., the base station could include a processing unit programmed) to reserve a portion the host-carrier air interface resources per subframe for use as the guest-carrier shared channel and to preclude use of the portion of the air interface resources per subframe for the host-carrier shared channel or to otherwise operate as discussed above. And the base station could limit use of the guest carrier to WCDs based on their PLMN.

Exemplary embodiments have been described above. Those skilled in the art will understand, however, that changes and modifications may be made to these embodiments without departing from the true scope and spirit of the invention. Further, various features described above with respect to certain embodiments could be implemented in other embodiments described above as well.

We claim:

1. A method for a base station to provide cellular wireless service on a guest carrier and a host carrier, the method comprising:
   providing service by the base station on the host carrier, wherein the host carrier has a host-carrier frequency range and defines, within the host-carrier frequency range, a host-carrier shared channel and host-carrier control channels; and
   providing service by the base station on the guest carrier concurrently with providing service by the base station on the host carrier, wherein the guest carrier has a guest-carrier frequency range that is narrower than the host-carrier frequency range and that is defined fully within and as a portion of the host-carrier frequency range, and wherein the guest carrier defines, within the guest-carrier frequency range, a guest-carrier shared channel and guest-carrier control channel,
   wherein providing service by the base station on the host carrier comprises providing the service on the host carrier using a frame structure that defines a continuum of frames each having subframes, each subframe being divided into air interface resources,
   wherein providing service by the base station on the guest carrier comprises providing the service on the guest carrier using the same frame structure, wherein frames of the service on the host carrier are time-aligned with frames of the service on the guest carrier, and wherein subframes of the service on the host carrier are time-aligned with subframes of the service on the guest carrier, and
   wherein providing service by the base station on the guest carrier concurrently with providing service on the host carrier comprises the base station prioritizing a portion of the air interface resources per subframe for use as the guest-carrier shared channel but allowing use of the portion of the air interface resources per subframe for the host-carrier shared channel.

2. The method of claim 1, wherein the host carrier and guest carrier are both time division duplex (TDD) and both use a common TDD frame configuration,
   whereby downlink subframes of the host carrier are time-aligned with downlink subframes of the guest carrier, and uplink subframes of the host carrier are time-aligned with uplink subframes of the guest carrier.

3. The method of claim 1,
   wherein providing service by the base station on the host carrier comprises broadcasting by the base station, within the host carrier, at least one host-carrier synchronization signal defining (i) a time-reference of the host carrier and (ii) an identification of the host carrier,
   wherein providing service by the base station on the guest carrier comprises broadcasting by the base station, within the guest carrier, at least one guest-carrier synchronization signal defining (i) a time-reference of the guest carrier and (ii) an identification of the guest carrier, and wherein the guest carrier is defined within the host carrier at a frequency position selected to avoid overlap of the at least one host-carrier synchronization signal with the at least one guest-carrier synchronization signal.

4. The method of claim 1,
wherein providing service by the base station on the host carrier comprises broadcasting by the base station, within the host carrier, a host-carrier control-format indicator specifying a format of a host-carrier control channel,
wherein providing service by the base station on the guest carrier comprises broadcasting by the base station, within the guest carrier, a guest-carrier control-format indicator specifying a format of a guest-carrier control channel, and
wherein the guest carrier is defined within the host carrier at a frequency position selected to avoid overlap of the host-carrier control-format indicator with the guest-carrier control-format indicator.

5. The method of claim 1,
wherein providing service by the base station on the host carrier comprises broadcasting by the base station, within the host carrier, a host-carrier reference signal,
wherein providing service by the base station on the guest carrier comprises broadcasting by the base station, within the guest carrier, a guest-carrier reference signal, and
wherein, within the guest carrier, the guest-carrier reference signal coincides with the host-carrier reference signal.

6. The method of claim 1, wherein providing service by the base station on the guest carrier concurrently with providing service by the base station on the host carrier comprises:
receiving a request from a wireless client device (WCD) to be served; and
responsive to the request, determining based on a service class of the WCD which carrier, of the host carrier and guest carrier, on which to serve the WCD.

7. The method of claim 6, wherein the service class of the WCD comprises a public land mobile network (PLMN) to which the WCD subscribes.

8. The method of claim 1, wherein the guest carrier is a first guest carrier, and wherein the portion of the host-carrier frequency range in which the first guest carrier is defined is a first portion, the method further comprising:
providing service by the base station on a second guest carrier concurrently with providing service by the base station on the host carrier and on the first guest carrier, wherein the second guest carrier has a second guest-carrier frequency range that is narrower than the host-carrier frequency range and that is defined fully within and as a second portion of the host-carrier frequency range not overlapping with the first portion of the host-carrier frequency range, and wherein the second guest carrier defines a second guest-carrier shared channel and second guest-carrier control channels.

9. A method for configuring a base station for concurrent service on a host carrier and a guest carrier, the method comprising:
configuring the base station to provide service on the host carrier, wherein the host carrier has a host-carrier range of frequency and defines, within the host-carrier range of frequency, a host-carrier shared channel and host-carrier control channels; and
configuring the base station to provide service on the guest carrier concurrently with providing service on the host carrier, wherein the guest carrier has a guest-carrier range of frequency that is narrower than the host-carrier range of frequency and that is defined fully within and as a portion of the host-carrier range of frequency, and wherein the guest carrier defines, within the guest-carrier range of frequency, a guest-carrier shared channel and guest-carrier control channels;
wherein configuring the base station to provide service on the host carrier comprises configuring the base station to provide the service on the host carrier using a frame structure that defines a continuum of frames each having subframes, each subframe being divided into air interface resources,
wherein configuring the base station to provide service on the guest carrier comprises configuring the base station to provide the service on the guest carrier using the same frame structure, wherein frames of the service on the host carrier are time-aligned with frames of the service on the guest carrier, and wherein subframes of the service on the host carrier are time-aligned with subframes of the service on the guest carrier, and
wherein configuring the base station to provide service on the guest carrier concurrently with providing service on the host carrier comprises configuring the base station to prioritize a portion of the air interface resources per subframe for use as the guest-carrier shared channel but to allow use of the portion of the air interface resources per subframe for the host-carrier shared channel.

10. The method of claim 9,
wherein configuring the base station to provide service on the host carrier comprises configuring the base station to broadcast, within the host carrier, (i) a host-carrier synchronization signal, (ii) a host-carrier control-format indicator, and (iii) a host-carrier reference signal,
wherein configuring the base station to provide service on the guest carrier comprises configuring the base station to broadcast, within the guest carrier, (i) a guest-carrier synchronization signal, (ii) a guest-carrier control-format indicator, and (iii) a guest-carrier reference signal, and
wherein the guest carrier is defined within the host carrier at a frequency position that (i) avoids overlap of the host-carrier synchronization signal with the guest-carrier synchronization signal, (ii) avoids overlap of the host-carrier control format indicator with the guest-carrier control-format indicator, and (iii) has the guest-carrier reference signal coincide with the host-carrier reference signal within the guest carrier.

11. A base station configured to provide service on a host carrier and on a guest carrier within the host carrier, wherein the host carrier has a host-carrier frequency range, and wherein the guest carrier has a guest-carrier frequency range that is narrower than the host-carrier frequency range and that occupies a portion of the host-carrier frequency range and is fully encompassed by the host-carrier frequency range, the base station comprising:
an antenna structure configured to transmit and receive air interface communication on the host carrier and on the guest carrier; and
a radio unit configured to output control signals for transmission by the antenna structure on the host carrier and to output guest-carrier control signals for transmission by the antenna structure on the guest carrier,
wherein the radio unit outputs for transmission on the host carrier (i) a host-carrier synchronization signal, (ii) a host-carrier control format indicator signal, and (iii) a host-carrier reference signal, wherein the radio unit outputs for transmission on the guest carrier (i) a guest-carrier synchronization signal, (ii) a guest-carrier control format indicator signal, and (iii) a guest-carrier reference signal, and wherein the guest-carrier frequency range is disposed within the host-carrier frequency range at a position that (i) avoids overlap of the host-carrier synchronization signal with the guest-carrier synchronization signal, (ii) avoids overlap of the host-carrier control-format indicator signal with the guest-carrier control-format indicator signal, and (iii) has the guest-carrier reference signal coincide with the host-carrier reference signal within the guest carrier.

12. The base station of claim 11, wherein the base station is configured to provide service on the host carrier using a frame structure that defines a continuum of frames each having subframes, and wherein the base station is configured to provide service on the guest carrier using the same frame structure, wherein frames of the service on the host carrier are time-aligned with frames of the service on the guest carrier, and wherein subframes of the service on the host carrier are time-aligned with subframes of the service on the guest carrier.

13. The base station of claim 12, wherein the host carrier defines a host-carrier shared channel, and wherein the guest-carrier defines a guest-carrier shared channel, wherein each subframe on the host carrier is divided over time and frequency into air interface resources, and wherein the base station is configured to reserve a portion the air interface resources per subframe for use as the guest-carrier shared channel and to preclude use of the portion of the air interface resources per subframe for the host-carrier shared channel.

14. The base station of claim 12, wherein the host carrier defines a host-carrier shared channel, and wherein the guest-carrier defines a guest-carrier shared channel, wherein each subframe on the host carrier is divided over time and frequency into air interface resources, and wherein the base station is configured to prioritize a portion of the air interface resources per subframe for use as the guest-carrier shared channel but to allow use of the portion of the air interface resources per subframe for the host-carrier shared channel.

15. The base station of claim 12, wherein the host carrier and guest carrier are both time division duplex (TDD) and both use a common TDD frame configuration, whereby downlink subframes of the host carrier are time-aligned with downlink subframes of the guest carrier, and uplink subframes of the host carrier are time-aligned with uplink subframes of the guest carrier.

16. The base station of claim 11, wherein the base station is configured to limit use of the guest carrier to wireless client devices based on public land mobile network identity.

* * * * *